US 6,745,510 B1

(12) United States Patent
Coker

(10) Patent No.: US 6,745,510 B1
(45) Date of Patent: *Jun. 8, 2004

(54) WATERFOWL DECOY

(76) Inventor: R. Howard Coker, 1100 W. Carolina St., Hartsville, SC (US) 29550

( * ) Notice: Subject to any disclaimer, the term of this patent is extended or adjusted under 35 U.S.C. 154(b) by 0 days.

This patent is subject to a terminal disclaimer.

(21) Appl. No.: 10/100,825

(22) Filed: Mar. 19, 2002

Related U.S. Application Data

(63) Continuation of application No. 09/625,076, filed on Jul. 25, 2000.

(51) Int. Cl.[7] .............................................. A01H 31/06
(52) U.S. Cl. .................. 43/3; 43/2; D22/125; D22/113; D21/445
(58) Field of Search .......................... 43/2, 3; D22/125, D22/113; D21/445

(56) References Cited

U.S. PATENT DOCUMENTS

| 957,750 | A | * | 5/1910 | Cunningham | 43/3 |
| 2,478,585 | A | * | 8/1949 | Kouba | 43/3 |
| 2,489,271 | A | * | 11/1949 | Colgan | 114/355 |
| 4,318,240 | A | * | 3/1982 | Hillesland | 43/3 |
| 4,972,620 | A | * | 11/1990 | Boler | 43/3 |
| 5,595,012 | A | * | 1/1997 | Coleman | 43/3 |
| 6,082,036 | A | * | 7/2000 | Cripe | 40/606 |

FOREIGN PATENT DOCUMENTS

GB          2189124 A  * 10/1987  .......... A01M/31/06

* cited by examiner

Primary Examiner—Peter M. Poon
Assistant Examiner—Andrea M. Valenti
(74) Attorney, Agent, or Firm—Nelson Mullins Riley & Scarborough, L.L.P.

(57) ABSTRACT

A waterfowl decoy that can assembled from a flat, planar sheet to a 3-deminsional decoy that is capable of stacking while assembled. Decoy comprises a sheet and an anchor. The sheet has an outer periphery shaped to resemble a waterfowl when the sheet is assembled in a 3-dimensional state, with a head, body and shoulder. The sheet is substantially symmetrical about a longitudinal axis, except for a bifurcated head. The head has a pair of members that are specifically asymmetrical to appear more realistic. The sheet also has a pair of shoulder segments that are aligned by flexing the sheet along the longitudinal axis and securing using an anchor. A plurality of decoys may be stacked, while in a fully assembled state and with anchors intact. While stacked, the anchors may be moved to a position that locks the stack so that individual decoys cannot be removed until the anchors are moved to a position that releases the stack.

9 Claims, 5 Drawing Sheets

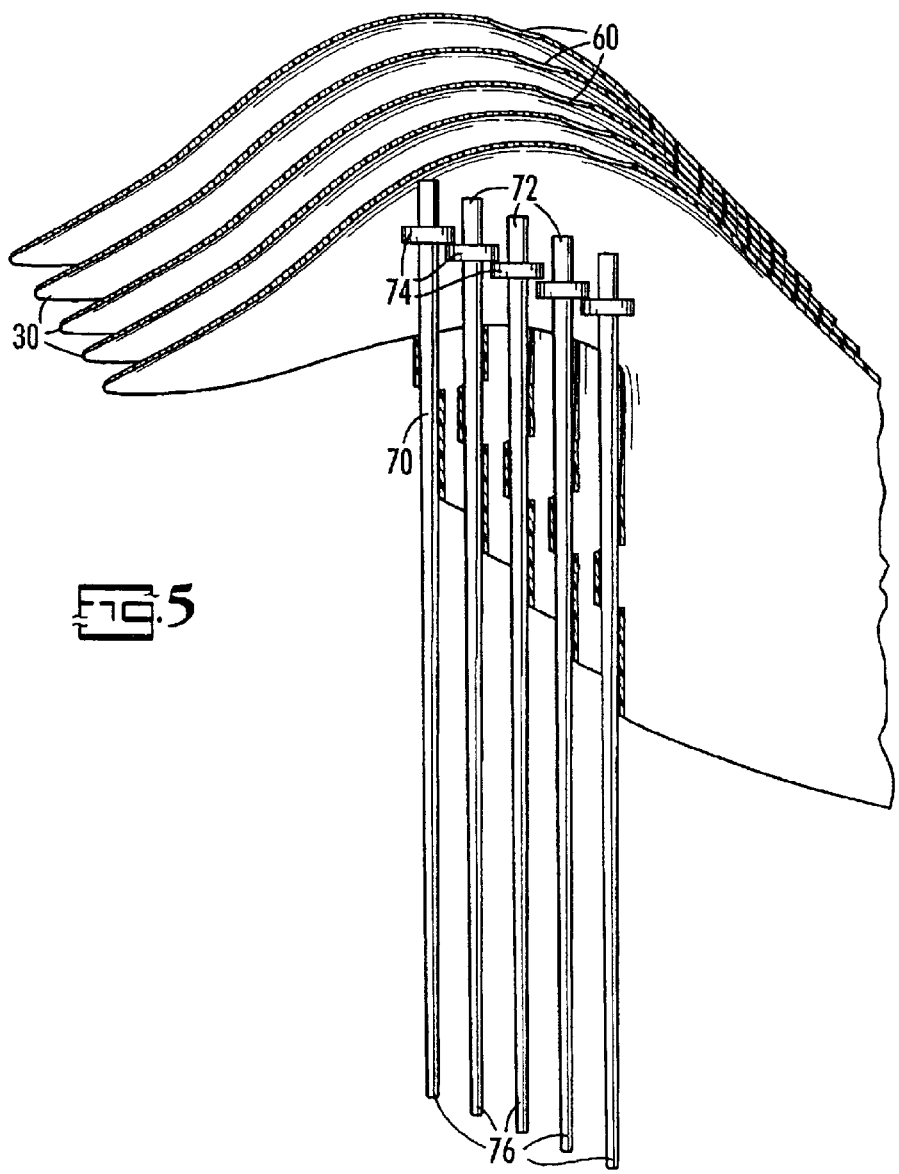

WATERFOWL DECOY

PRIORITY STATEMENT

This is a continuation of application Ser. No. 09/625,076, filed Jul. 25, 2000.

FIELD OF THE INVENTION

The present invention relates generally to decoys for waterfowl, and in particular to stackable waterfowl decoys.

BACKGROUND OF THE INVENTION

Decoys are commonly used by hunters to lure game within shooting distance. In order to attract waterfowl, hunters place decoys in feeding and resting areas of migrating waterfowl. The decoys entice waterfowl flying overhead to land in close proximity. When the waterfowl attempts to land near the decoys, the waiting hunter will be in a better position to kill the animal.

To be effective, the decoys must realistically simulate waterfowl. Although two-dimensional decoys have cost-effective advantages from a manufacturing and packaging standpoint, three-dimensional decoys tend to be more effective as appearing more life-like. Adding a motion capability to the decoy also increases effectiveness. A decoy is capable of moving by being anchored in an elevated position such that wind causes the decoy to move.

Numerous decoys must be deployed to effectively attract certain species of waterfowl. In some cases, depending upon the species of waterfowl, 500 to 1000 decoys must be deployed. Although hunters prefer to deploy three-dimensional decoys due to increased effectiveness, the transport and storage of numerous three-dimensional decoys is difficult.

In order to reduce the problems associated with the transport and storage of three-dimensional decoys, stackable decoys have been devised. Stackable decoys substantially reduce the amount of space required to store a plurality of decoys. Examples of stackable decoys can be found in U.S. Pat. No. 4,318,240 to Hillesland and U.S. Pat. No. 4,972,630 to Boler.

Hillesland describes a stackable decoy that can be converted from a flat sheet to a three-dimensional decoy. To form the three-dimensional decoy, the flat sheet is folded so that integral tabs are connected to inter-fitting slits. The decoy is deployed by anchoring the decoy into the ground. After deployment, the decoys must be disassembled to a flat, planar state and stacked. Hillesland suffers the deficiency of requiring the hunter to disassemble the decoys for stacking. In other words, the decoys cannot be stacked in the three-dimensional state. Moreover, the hunter is required to separately store the anchors.

Boler also describes a stackable decoy that can be assembled in a 3-dimensional state. Although Boler improves upon Hillesland by allowing the decoys to be stacked while assembled, Boler also suffers the deficiency of requiring the anchors to be separately stored. The design in Boler does not allow the decoys to be stacked while the anchor is attached to the decoy.

Therefore, there is a need for a waterfowl decoy that appears realistic while being easily transported and stored, without requiring individual components of the decoy to be stored separately.

SUMMARY OF THE INVENTION

According to its major aspects and briefly stated, the present invention is a waterfowl decoy that can assembled from a flat, planar sheet to a 3-dimensional decoy that is capable of stacking while assembled. The decoy basically comprises a sheet and an anchor. The sheet has an outer periphery shaped to resemble a waterfowl when sheet is assembled in a 3-dimensional state. The sheet is substantially symmetrical about a longitudinal axis, except for a bifurcated head. The head has a pair of segments that are specifically designed to be asymmetrical, for a more realistic appearance. The sheet also has a pair of shoulder segments that are aligned by flexing sheet along the longitudinal axis.

The shoulders segments are secured together using an anchor. The bottom end of anchor is received through shoulder segments and a hole in the body of sheet, such that sheet is capable of rotating about anchor in the wind. The bottom end of anchor is preferably tapered so that it can be placed into the ground. Depending upon the position of anchor, sheet can be configured to either rest on the ground or be elevated.

A plurality of decoys may be stacked, while in a fully assembled state and with anchors intact. While stacked, the anchors may be moved to a position that locks the stack so that individual decoys cannot be removed until the anchors are moved to a position that releases the stack.

An important feature of the present invention is the integrated design of the anchor that allows the decoy to be stacked in a fully assembled state, including the anchor. This feature substantially reduces that amount of space required to store a plurality of decoys. Moreover, the distribution of the decoys is much quicker due to the centralized location of the decoys in a single stack, with the anchors already attached.

Another important feature of the present invention is the non-symmetrical design of the decoy head. With an asymmetrical design of the head, the decoy appears more realistic from overhead, where the approaching waterfowl will see the decoy. As a result, approaching waterfowl will be more likely to land near a decoy with this type of head. Consequently, the hunter will be more likely be successful.

Other features and their advantages will be apparent to those skilled in the art from a careful reading of the Detailed Description of Preferred Embodiments, accompanied by the drawings.

BRIEF DESCRIPTIONS OF THE DRAWINGS

In the Figures,

FIG. 5 is a side cross sectional view of a plurality of stacked decoys in an assembled condition, according to a preferred embodiment of the present invention.

DETAILED DESCRIPTION OF PREFERRED EMBODIMENTS

Figure 1:
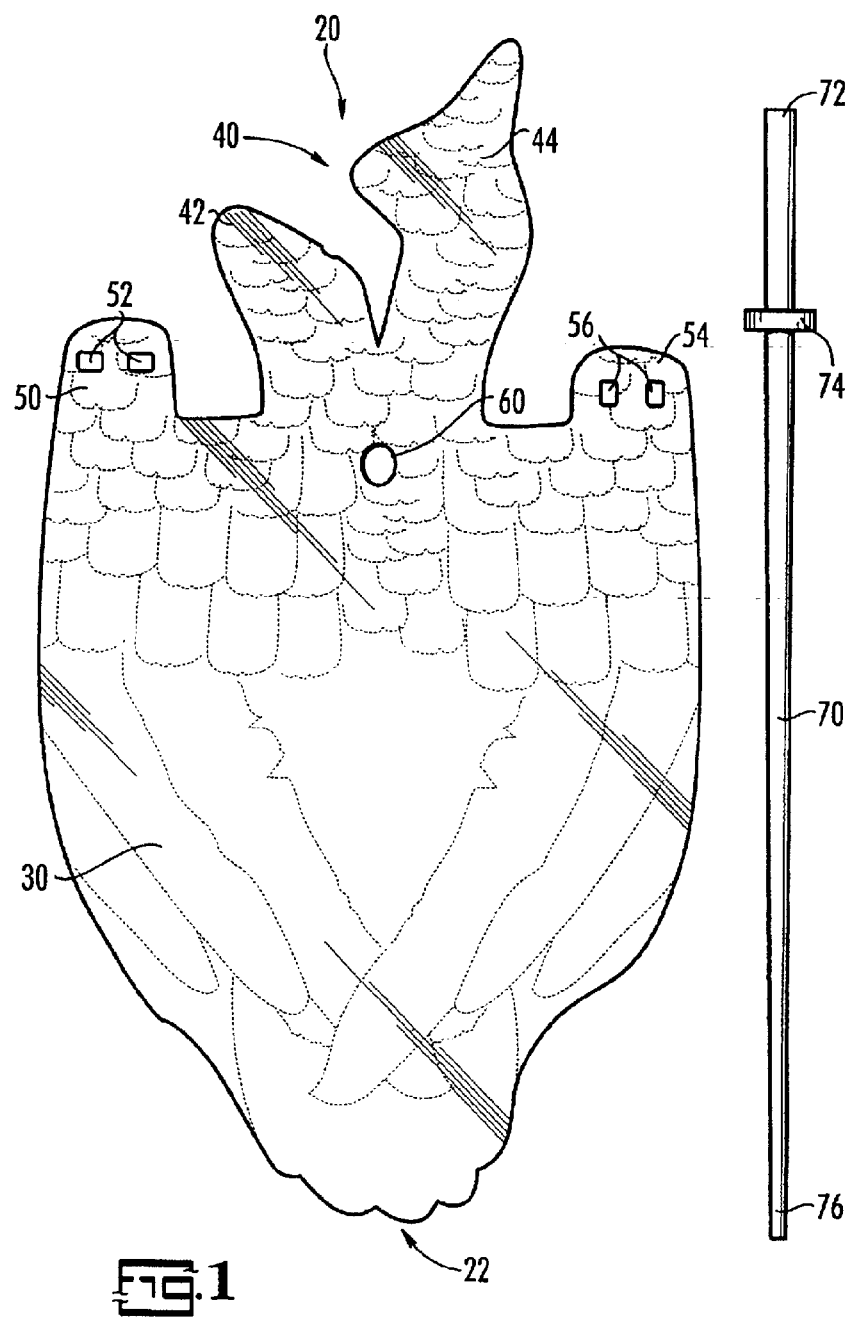
FIG. 1 is a top view of a decoy in a disassembled condition, according to a preferred embodiment of the present invention.
Figure 2:
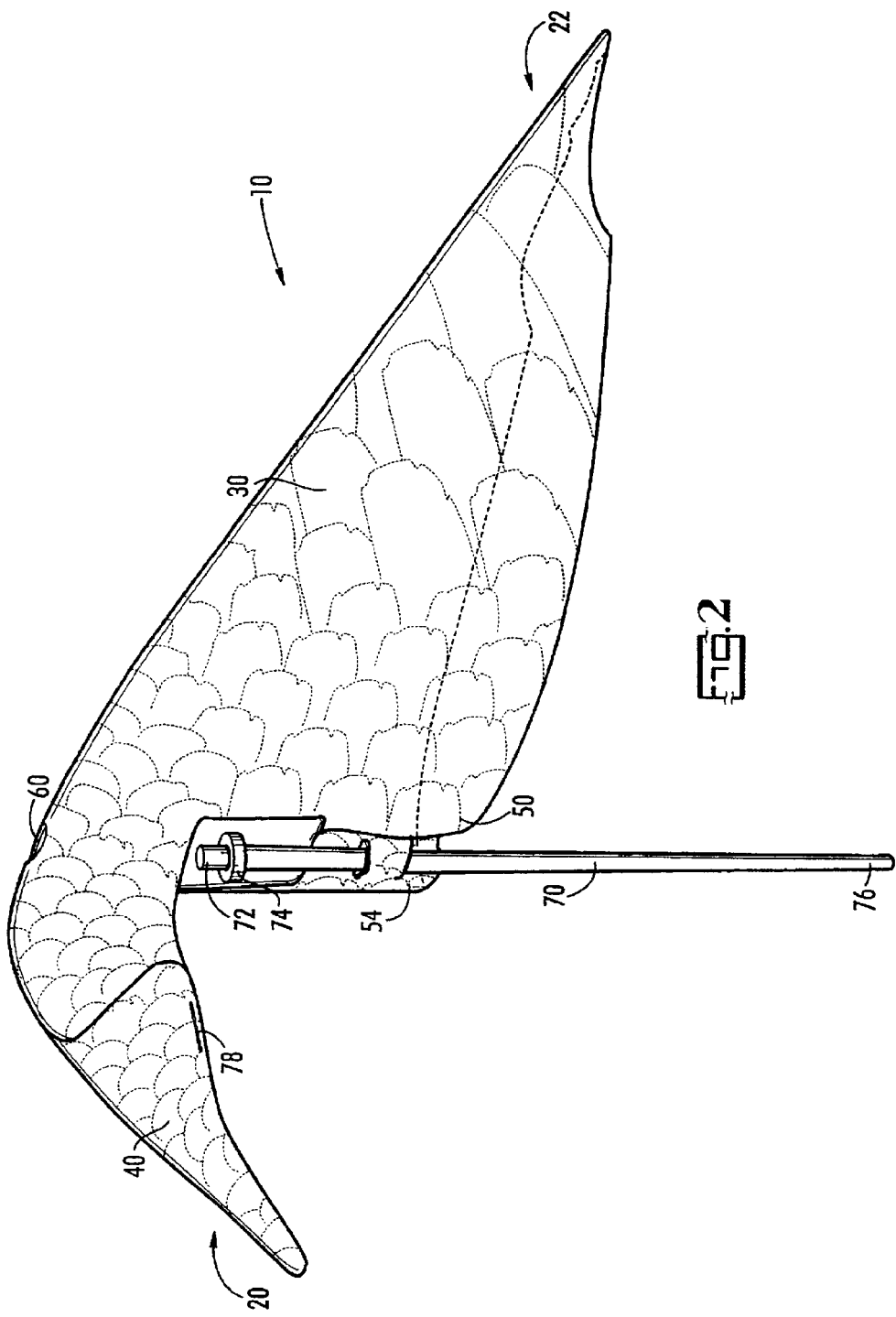
FIG. 2 is a perspective view of a decoy in an assembled condition, according to a preferred embodiment of the present invention.
Figure 3:
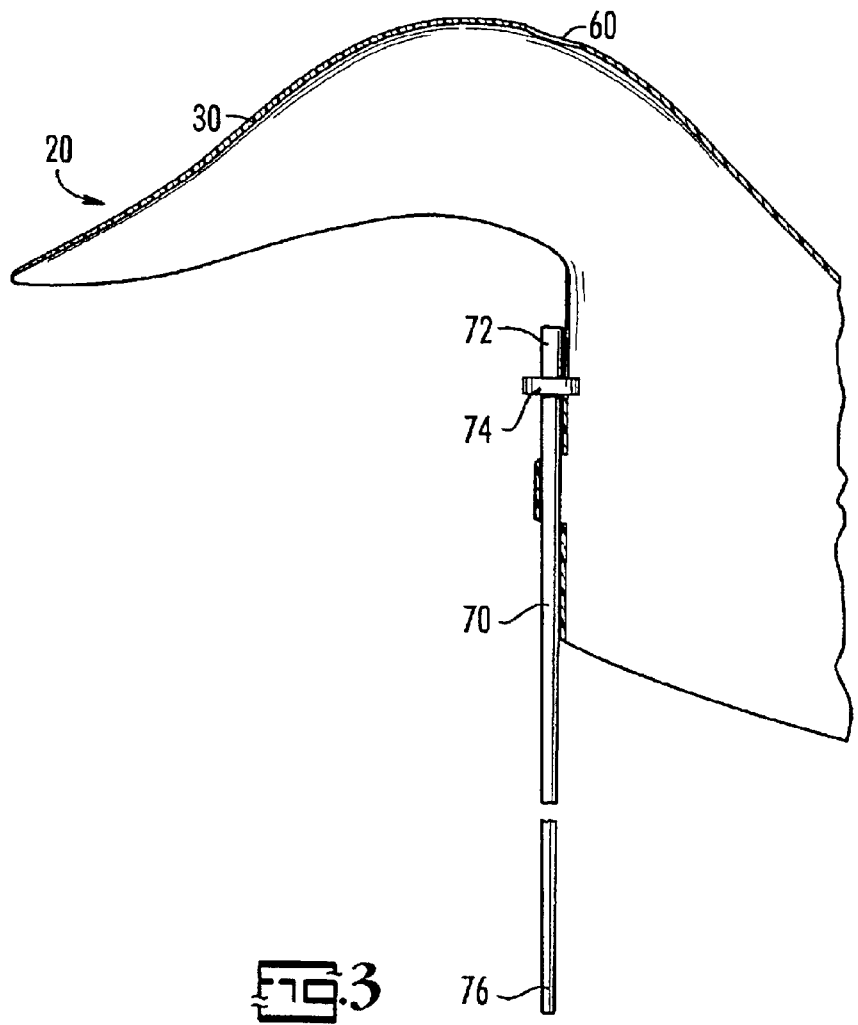
FIG. 3 is a side cross sectional view of a decoy in an assembled condition, with the anchor positioned such that the decoy can be mounted into the ground, according to a preferred embodiment of the present invention.

The present invention is a waterfowl decoy that can assembled from a flat sheet as illustrated in FIG. 1 to a 3-dimensional decoy as illustrated in FIGS. 2 and 3. A plurality of decoys may be stacked together for compact storage as illustrated if FIGS. 4 and 5.

FIG. 1 illustrates a decoy in a disassembled, planar state. Decoy comprises a sheet 30 and an anchor 70. Sheet 30 has an outer periphery shaped to resemble a waterfowl when sheet 30 is assembled in a 3-dimensional state. Sheet 30 has a front portion 20 and a rear portion 22. Sheet 30 has a bifurcated head 40 positioned near the front portion 20. Head 40 has a first head segment 42 and a second head segment 44. First head segment 42 and second head segment 44 can be connected together using attachment means 78 along the longitudinal axis of sheet 30 to resemble the head of a waterfowl as illustrated in FIG. 2. Unlike prior art decoys, first head segment 42 and second head segment 44 are specifically asymmetrical. As a result, head 40 appears more realistic. The term "beak" refers to the portion of the head 40 that corresponds to the beak or bill of the waterfowl.

Sheet 30 has a pair of shoulder segments 50 and 54 that are connected together using anchor 70. First shoulder segment 50 and second shoulder segment 54 are symmetrical along the longitudinal axis from front portion 20 to rear portion 22. First shoulder segment 50 and second shoulder segment 54 has a first hole set 52 and second hole set 56, respectively. Each hole in the pair of hole sets 52 and 56 are aligned so that anchor 70 can be received within holes as illustrated in FIGS. 2 and 3. Anchor 70 is inserted into pair of hole sets by placing bottom end of anchor through pair of hole sets 52 and 56. Accordingly, head 20 is flexed so that bottom end of anchor 70 is received through pair of hole sets 52 and 56.

An anchor 70 is used to connect first shoulder segment 50 and second shoulder segment 54. Anchor 70 has a top end 72 and a bottom end 76, Bottom end 76 of anchor 70 is preferably tapered so that bottom end 76 can be inserted into the ground. Top end 72 of anchor 70 is capable of being received by back hole 60 in sheet 30. With anchor 70 positioned in back hole, sheet 30 is capable of rotating about anchor 70 in the wind. A ring 74 positioned near the top end 72 of anchor 70 limits movement of anchor 70. Depending upon the position of anchor 70, sheet 30 can be configured to either rest on the ground or be elevated.

Figure 4:
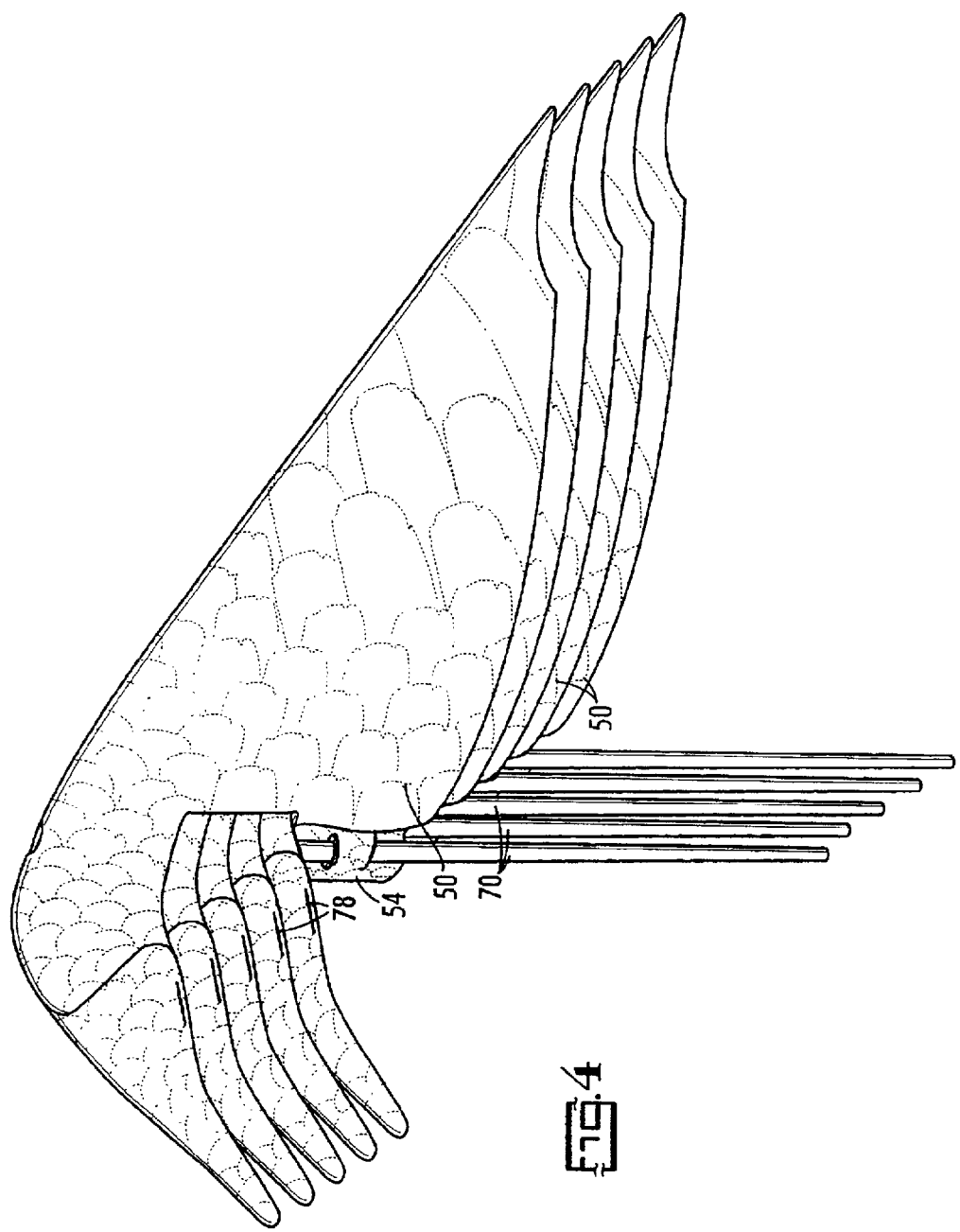
FIG. 4 is a perspective view of a plurality of stacked decoys in an assembled condition, according to a preferred embodiment of the present invention.

As illustrated in FIGS. 4 and 5, a plurality of decoys may be stacked, while in a fully assembled state and with anchors intact. Upon stacking the decoys, anchors may be moved to a position such that top end 72 of anchor is in contact with head 40. As a result, the stack is locked so that individual decoys cannot be removed until anchor is moved to a position such that the top end 72 of anchor is not in contact with head 40.

In use, decoy may be shipped in a disassembled, planar state. Alternatively, decoy may be shipped in a stacked state. A hunter may disperse the decoys by merely placing the decoys on the ground or anchoring the decoys into the ground. The decoys may be stored in a stacked state between hunts.

It will be apparent to those skilled in the art that many substitutions and modifications can be made to the preferred embodiments just described without departing from the spirit and scope of the present invention, defined by the appended claims.

What is claimed is:

1. A decoy for waterfowl, said decoy comprising:
   an integral, uninterrupted sheet being configured in a three-dimensional assembled state so as to resemble a predetermined waterfowl, said sheet having a longitudinal axis extending between a front end and a rear end;
   a body portion positioned near said rear end;
   a head portion positioned near said front end, said head portion being bifurcated into a first head segment and a second head segment wherein said second head segment forms the entire beak portion of said head portion;
   a pair of shoulder members positioned between said body and said head portion;
   an anchor connected to said sheet for insertion into the ground; and
   wherein said anchor connects said pair of shoulder members together.

2. The decoy as recited in claim 1, wherein said second head segment is connected to said first head segment such that said second head segment proximate to said front of said sheet is substantially centered along said longitudinal axis.

3. The decoy as recited in claim 1, wherein said sheet is dimensioned and configured to be stacked with a plurality of said sheets while in said assembled state.

4. A decoy for waterfowl, said decoy comprising:
   an integral, uninterrupted sheet being configured in a three-dimensional assembled state so as to resemble a predetermined waterfowl, said sheet having a longitudinal axis extending between a front end and a rear end;
   a body portion positioned near said rear end;
   a head portion positioned near said front end, said head portion being bifurcated asymmetrically about said longitudinal axis into a first head segment and a second head segment;
   a pair of shoulder members positioned between said body and said head portion;
   an anchor connected to said sheet for insertion into the ground;
   wherein said second head segment forms the entire beak portion of said head portion; and wherein said anchor connects said pair of shoulder members together.

5. A decoy for waterfowl, said decoy comprising:
   an integral, uninterrupted sheet having a longitudinal axis extending between a front end and a rear end, said sheet having:
   a body portion positioned near said rear end,
   a head portion positioned near said front end, said head portion being asymmetrically bifurcated along said longitudinal axis into a first head segment and a second head segment wherein said second head segment forms the entire beak portion of said head portion, and
   a pair of shoulder members positioned between said body and said head; and
   an anchor securing said pair of shoulder members together when said sheet is flexed about its longitudinal axis, thereby transforming said sheet to an assembled state.

6. The decoy as recited in claim 5, wherein said sheet is dimensioned and configured to be stacked with a plurality of said sheets while in said assembled state without removing said anchor.

7. The decoy as recited in claim 5, wherein said pair of shoulder members are symmetrically positioned along said longitudinal axis.

8. The decoy as recited in claim 7, wherein each shoulder member of said a pair of shoulder members contain at least two holes which are dimensioned to allow said anchor to pass therethrough.

9. The decoy as recited in claim 5, wherein said anchor has a tapered lower end.

* * * * *